(12) United States Patent
Fujita

(10) Patent No.: US 9,190,097 B2
(45) Date of Patent: Nov. 17, 2015

(54) OPTICAL INFORMATION RECORDING/REPRODUCING DEVICE AND OPTICAL INFORMATION RECORDING/REPRODUCING METHOD

(71) Applicant: Hitachi-LG Data Storage, Inc., Tokyo (JP)

(72) Inventor: Kouji Fujita, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 14/533,192

(22) Filed: Nov. 5, 2014

(65) Prior Publication Data

US 2015/0146511 A1 May 28, 2015

(30) Foreign Application Priority Data

Nov. 27, 2013 (JP) ................................. 2013-244498

(51) Int. Cl.
*G11B 7/0065* (2006.01)
*G11B 7/24044* (2013.01)
*G11B 7/08* (2006.01)
*G11B 7/1353* (2012.01)
*G11B 7/007* (2006.01)

(52) U.S. Cl.
CPC ............ *G11B 7/082* (2013.01); *G11B 7/00772* (2013.01); *G11B 7/1353* (2013.01)

(58) Field of Classification Search
None
See application file for complete search history.

(56) References Cited

U.S. PATENT DOCUMENTS

| 5,128,693 | A   | * | 7/1992  | Tatemichi et al. ............ 347/260 |
| 7,116,626 | B1  | * | 10/2006 | Woods et al. ................. 369/103 |
| 8,130,620 | B2  |   | 3/2012  | Tanaka |
| 2005/0088713 | A1 | * | 4/2005 | Kim ............................... 359/10 |
| 2006/0114792 | A1 | * | 6/2006 | Uno et al. ..................... 369/103 |
| 2006/0146386 | A1 | * | 7/2006 | Yamatsu et al. ................ 359/25 |
| 2006/0152783 | A1 | * | 7/2006 | Butler et al. .................... 359/24 |
| 2007/0019267 | A1 | * | 1/2007 | Kogure et al. .................. 359/24 |
| 2007/0019692 | A1 | * | 1/2007 | Kogure et al. .................. 372/34 |
| 2007/0115523 | A1 | * | 5/2007 | Matsumura et al. ............ 359/24 |
| 2007/0211321 | A1 | * | 9/2007 | Hoskins et al. ................. 359/24 |
| 2007/0216981 | A1 | * | 9/2007 | Matsumura et al. ............ 359/24 |
| 2007/0236765 | A1 | * | 10/2007 | Jung ............................... 359/11 |
| 2007/0247683 | A1 | * | 10/2007 | Kim .................................. 359/1 |

(Continued)

FOREIGN PATENT DOCUMENTS

| JP | 2008-97752 A | 4/2008 |
| JP | 2010-3358 A  | 1/2010 |
| JP | 2010-44830 A | 2/2010 |

*Primary Examiner* — Peter Vincent Agustin
(74) *Attorney, Agent, or Firm* — Baker Botts L.L.P.

(57) ABSTRACT

In an optical information recording/reproducing device that radiates signal light and reference light to a recording medium, forms a hologram, and records information and emits the reference light to the hologram of the recording medium and reproduces information, a laser light source that generates the signal light and the reference light; a light angle control unit that controls an angle of the reference light incident on the recording medium; a light detecting unit that detects diffracted light when the reference light is radiated; a positioning unit that allocates an address to the recording medium and performs positioning of the recording medium for the address; a tilt measuring unit that measures a tilt of the recording medium; and a control unit that controls the incidence angle of the reference light, on the basis of a tilt measurement result in a recording mode, in a reproduction mode, are included.

18 Claims, 9 Drawing Sheets

(56) References Cited

U.S. PATENT DOCUMENTS

2008/0174841 A1* 7/2008 Shimokawa ............... 359/11
2009/0016189 A1* 1/2009 Kwak et al. .............. 369/103
2009/0086605 A1* 4/2009 Ide et al. .................. 369/103
2009/0116086 A1* 5/2009 Uno et al. ................. 359/22
2012/0050831 A1* 3/2012 Shimada et al. ........... 359/22
2013/0128327 A1* 5/2013 Hosaka ..................... 359/22

* cited by examiner

OPTICAL INFORMATION RECORDING/REPRODUCING DEVICE AND OPTICAL INFORMATION RECORDING/REPRODUCING METHOD

CROSS-REFERENCE TO RELATED APPLICATIONS

This application claims the priority of Japanese Patent Application No. 2013-244498, filed on Nov. 27, 2013, which is incorporated herein by reference in its entirety.

BACKGROUND OF THE INVENTION

1. Field of the Invention

The present invention relates to an optical information recording/reproducing device that records information on an optical information recording medium using interference patterns of signal light and reference light as page data and/or reproduces information from the optical information recording medium.

2. Description of the Related Art

As the related art of a field of present technology, JP-2010-3358-A is known. In JP-2010-3358-A, "a tilt error signal generating mechanism for generating a tilt error signal from a hologram reproduction signal for tilt detection previously recorded on an optical disk and a control mechanism for correcting a tilt of the optical disk on the basis of the tilt error signal" are described. In addition, JP-2010-44830-A is known. In JP-2010-44830-A, "a method related to a tilt detection method of a hologram device and suitable for a coaxial method, recording a first tilt reference hologram, a second tilt reference hologram, a third tilt reference hologram, and a fourth tilt reference hologram in the same area, and obtaining a signal for tilt correction from the holograms recorded as described above in a reproduction mode" are described.

SUMMARY OF THE INVENTION

JP-2010-3358-A and JP-2010-44830-A disclose technology for controlling a tilt of a recording medium at a tilt angle at which hologram reproduction diffracted light for tilt detection previously recorded on the recording medium can be optimally reproduced. Reproduction of the holograms requires a large amount of reproduction parameters such as a laser light source wavelength, a posture (a tilt of a Bragg direction and a tilt of a pitch direction) of the recording medium, a defocus, and position alignment of an objective lens optical system and a reproduction hologram. For this reason, a long process time is necessary to detect the tilt of the recording medium using the hologram reproduction diffracted light and a system is unstable.

In recording of a page multiplexing hologram of two beams, an angle of reference light for each page is changed for every 75 mdeg and multiplex recording of a plurality of page data is performed on the same place of the recording medium. Meanwhile, in tolerance of the angle of the reference light in a reproduction mode for recording, angle positioning precision of ±5 mdeg or less is necessary to reproduce the page data. However, an incidence angle of the reference light on the recording medium may be changed momentarily by distortion of the recording medium, a surface contact due to deformation, and mechanical tolerance, whenever a recording position of the recording medium is changed. This is an independent event in the recording mode and the reproduction mode and it is not possible to determine an angle (initial angle) of reference light to reproduce a first page hologram after positioning of the recording medium. In order to reproduce the page data at a high speed, it is important to quickly perform positioning at the initial angle of the reference light at which the first page data can be reproduced after the positioning of the recording medium and find out page data of the first page quickly.

Accordingly, an object of the present invention is to reproduce page data at a high speed, for a desired reproduction position on a recording medium.

The above-described problems can be resolved by controlling an incidence angle of reference light on the basis of a tilt measurement result in a recording mode, in a reproduction mode, for example.

According to the present invention, page data can be reproduced at a high speed, for a desired reproduction position on a recording medium.

DESCRIPTION OF THE PREFERRED EMBODIMENTS

Hereinafter, embodiments of the present invention will be described using the drawings.

First Embodiment

Figure 8:
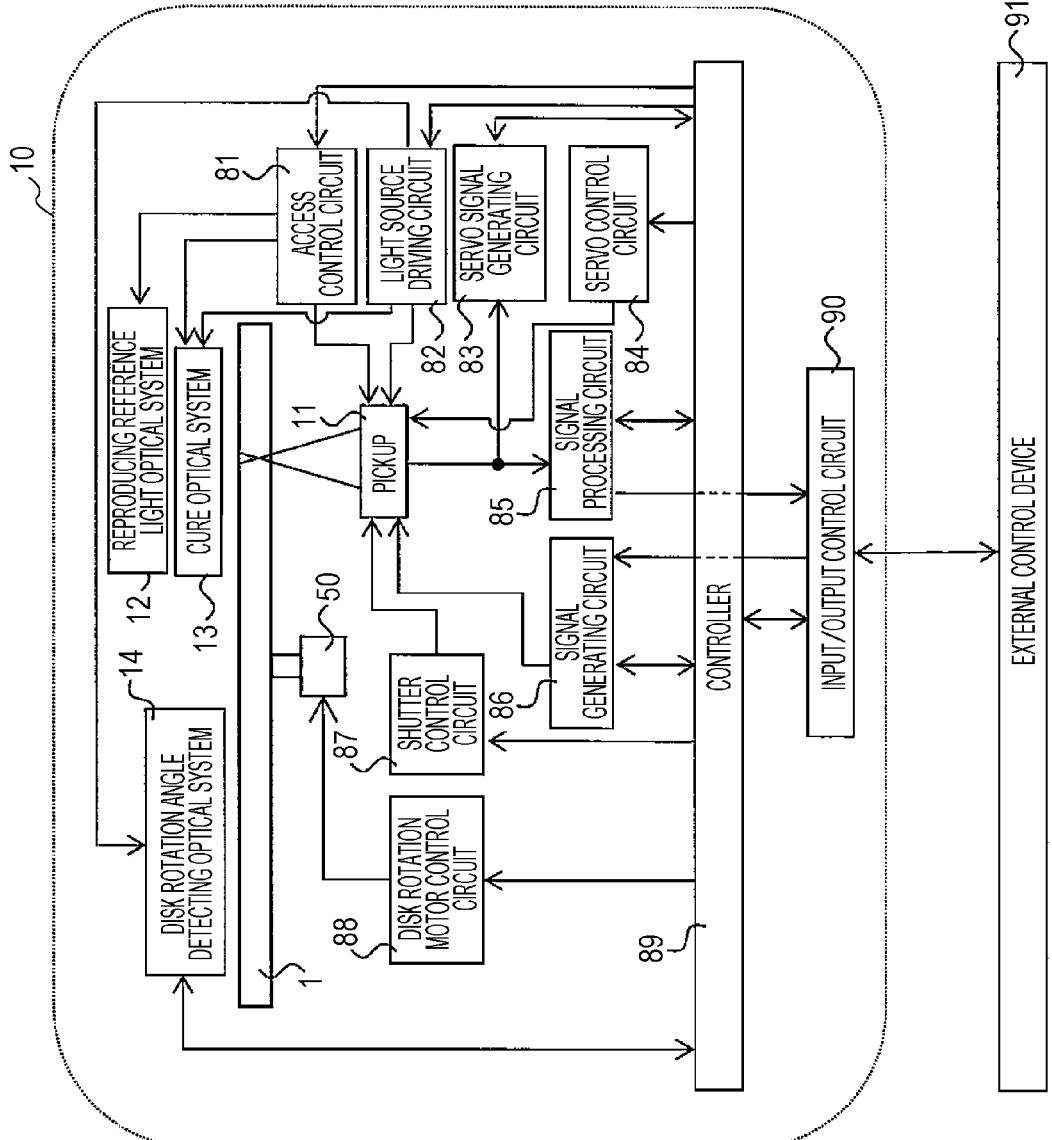
FIG. 8 is a block diagram of an optical information recording/reproducing device.

Embodiments of the present invention will be described with reference to the accompanying drawings. FIG. 8 is a block diagram illustrating a recording/reproducing device of an optical information recording medium that records and/or reproduces digital information using holography.

An optical information recording/reproducing device 10 is connected to an external control device 91 through an input/output control circuit 90. When recording is performed, the optical information recording/reproducing device 10 receives a recorded information signal from the external control device 91 by the input/output control circuit 90. When reproduction is performed, the optical information recording/reproducing device 10 transmits the reproduced information signal to the external control device 91 by the input/output control circuit 90.

The optical information recording/reproducing device 10 includes a pickup 11, a reproducing reference light optical system 12, a cure optical system 13, a disk rotation angle detecting optical system 14, and a rotation motor 50 and an optical information recording medium 1 is configured to be rotatable by the rotation motor 50.

The pickup 11 performs a function of radiating reference light and signal light to the optical information recording medium 1 and recording digital information on a recording medium using the holography. At this time, the recorded information signal is transmitted to a spatial light modulator in the pickup 11 through a signal generating circuit 86 by a controller 89 and the signal light is modulated by the spatial light modulator.

When the information recorded on the optical information recording medium 1 is reproduced, a light wave to make the reference light radiated from the pickup 11 incident on the optical information recording medium in a direction reverse to a direction in a recording mode is generated by the reproducing reference light optical system 12. The reproduction light reproduced by the reproducing reference light is detected by a light detector to be described below in the pickup 11 and a signal is reproduced by a signal processing circuit 85.

Radiation times of the reference light and the signal light radiated to the optical information recording medium 1 can be adjusted by controlling an opening/closing time of a shutter in the pickup 11 through a shutter control circuit 87 by the controller 89.

The cure optical system 13 performs a function of generating light beams used for precure and postcure of the optical information recording medium 1. The precure is a preprocess for radiating a predetermined light beam in advance before radiating the reference light and the signal light to a desired position, when information is recorded on the desired position in the optical information recording medium 1. The postcure is a postprocess for radiating a predetermined light beam to disable additional recording on the desired position, after the information is recorded on the desired position in the optical information recording medium 1.

The disk rotation angle detecting optical system 14 is used to detect a rotation angle of the optical information recording medium 1. When a rotation angle of the optical information recording medium 1 is adjusted to a predetermined rotation angle, a signal according to the rotation angle can be detected by the disk rotation angle detecting optical system 14 and the rotation angle of the optical information recording medium 1 can be controlled through a disk rotation motor control circuit 88 by the controller 89, using the detected signal.

A predetermined light source driving current is supplied from a light source driving circuit 82 to light sources in the pickup 11, the cure optical system 13, and the disk rotation angle detecting optical system 14 and a light beam having a predetermined light amount is emitted from each light source.

In addition, in the pickup 11 and the cure optical system 13, mechanisms for enabling sliding in a radial direction of the optical information recording medium 1 are provided and position control is performed through an access control unit 81.

Meanwhile, in recording technology using the angle multiplex principle of the holography, an allowable error for a deviation of an angle of the reference light tends to significantly decrease.

Therefore, it is necessary to provide a mechanism for detecting a deviation amount of the angle of the reference light in the pickup 11 and provide a servo mechanism for generating a signal for servo control by a servo signal generating circuit 83 and correcting the deviation amount by a servo control circuit 84 in the optical information recording/reproducing device 10.

In addition, the pickup 11, the cure optical system 13, and the disk rotation angle detecting optical system 14 may be simplified by integrating some optical system configurations or all optical system configurations as one optical system configuration.

Figure 1:
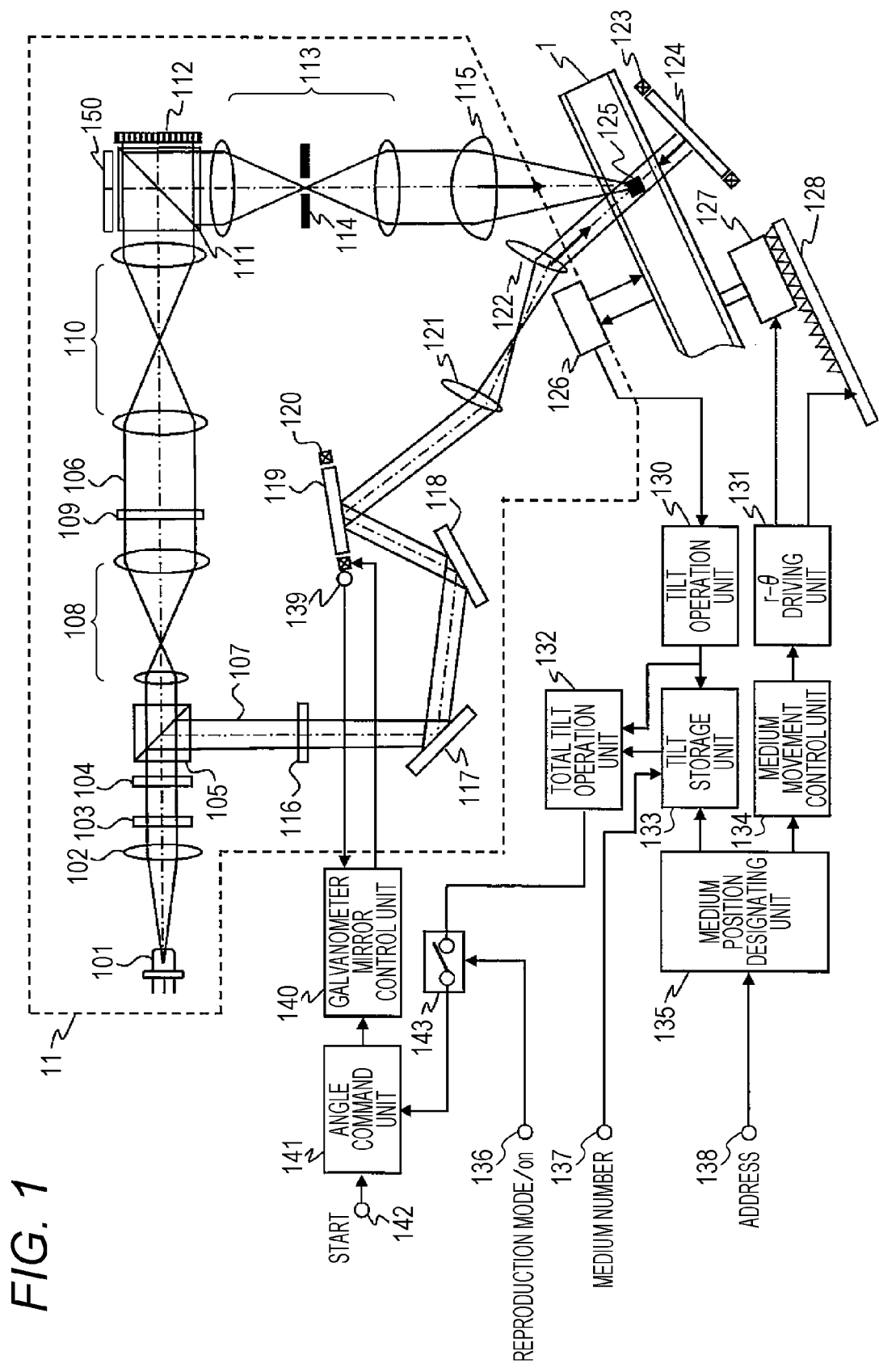
FIG. 1 is a diagram illustrating a first embodiment of the present invention.

FIG. 1 illustrates an example of an optical system configuration of the pickup 11 in the optical information recording/reproducing device 10. First, a recording sequence of a hologram will be described.

A light beam emitted from a light source 101 transmits a collimating lens 102 and is incident on a shutter 103. When the shutter 103 is opened, after the light beam passes through the shutter 103, a polarization direction of the light beam is adjusted such that a light amount ratio of P polarized light and S polarized light becomes a desired ratio by an optical element 104 composed of a ½ wavelength plate. Then, the light beam is incident on a polarization beam splitter (PBS) prism 105. The light beam having transmitted the PBS prism 105 functions as signal light 106 and a light beam diameter thereof is increased by a beam expander 108. Then, the light beam transmits a phase mask 109, a relay lens 110, and a PBS prism 111 and is incident on a spatial light modulator 112. The signal light to which information has been added by the spatial light modulator 112 is reflected on the PBS prism 111 and propagates through a relay lens 113 and a polytopic filter 114. Then, the signal light is condensed on the optical information recording medium 1 by an objective lens 115.

Meanwhile, the light beam having reflected on the PBS prism 105 functions as reference light 107 and a polarization direction thereof is set to a predetermined polarization direction according to a recording mode or a reproduction mode, by a polarization direction converting element 116. Then, the light beam is incident on a galvanometer mirror 119 via mirrors 117 and 118. The galvanometer mirror 119 adjusts an angle of the mirror by an actuator 120 to adjust an optical axis angle of the reference light. After the reference light passes through a lens 121 and a scanner lens 122, the reference light is incident on the recording medium 1. As such, the signal light and the reference light are overlapped and incident on the recording medium 1 to form an interference fringe pattern (hologram) 125 of light and the pattern is exposed to the recording medium 1 to record information (page data). In addition, because an incidence angle of the reference light incident on the recording medium 1 can be changed by the galvanometer mirror 119, multiple recording of a plurality of page data on the same place of the recording medium is enabled.

Next, a detailed recording sequence of the hologram will be described.

Figure 9:
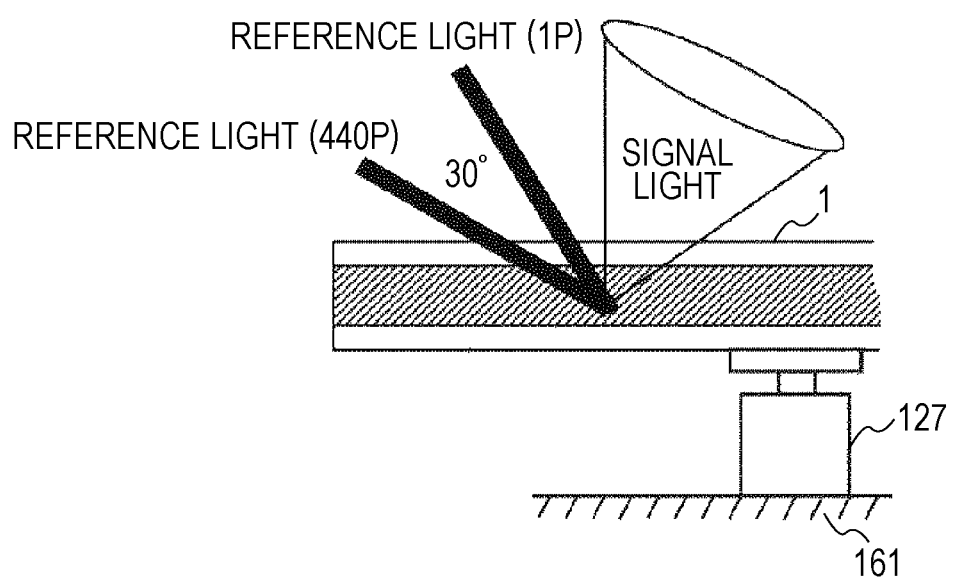
FIG. 9 is a diagram illustrating a relation of signal light and reference light for a recording medium.

FIG. 9 is a diagram illustrating a relation of the signal light and the reference light for the recording medium 1. For example, when multiple recording of page data of 400 pages is performed on a section of 30° from a low angle (1 P) to a high angle (440 P), an angle interval of the reference light per page is 75 mdeg. The galvanometer mirror 119 sequentially changes an angle by a mirror angle step corresponding to a half value of the angle of the reference light for page data of first to four hundredth pages and records the page data. The angle of the reference light is changed by controlling angles of the galvanometer mirror 119 and the actuator 120 to rotatingly drive the galvanometer mirror. An angle detecting unit 139 that detects a rotation angle of the galvanometer mirror 119 inputs an angle signal to a galvanometer mirror control unit 140. The galvanometer mirror control unit 140 receives a target angle command signal from an angle command unit 141, performs feedback control of the angle such that the angle signal shows a target angle, drives the galvanometer mirror 119, and controls the angle of the reference light. When recording is performed, after positioning of the recording medium is performed on a recording position of a book, according to a start signal of an input terminal 142, the angle command unit 141 designates an angle section from 30 deg to 60 deg at an interval of 75 mdeg, sequentially changes the reference light angles of 400 pages by the galvanometer mirror 119, and records each page data. When the recording is performed, the recording is performed at a predetermined galvanometer mirror rotation angle, regardless of a tilt state of the recording medium. A reproduction mode on signal is input from an input terminal 136, such that a switch unit 143 is turned off, when the recording is performed.

Hereinafter, the recording medium 1 is described as having a disk shape to describe a recording operation. However, the present invention is not limited thereto and the recording medium 1 may have a card shape. The recording medium 1 is rotated by a spindle motor 127, a movement of a radial direction of the disk-shaped medium is performed by a radius movement stage 128, the recording position of the recording medium 1 for the objective lens 115 is changed, a hologram 125 is spread on an entire area of the disk-shaped medium, and the hologram is recorded. The inclination posture (tilt) with a surface of the recording medium 1 for the objective lens 115 is not constant whenever the recording medium 1 moves. For example, when a rotation shaft of the spindle motor 127 and the recording medium 1 are obliquely mounted or there is mechanical tolerance, surface wobbling is generated by rotating the recording medium 1. In addition, an oblique mounting state of the recording medium 1 may be changed whenever the recording medium 1 is attached or detached. In addition, in the recording medium 1, surface distortion exists for each recording place and the tilt state is changed due to an individual difference, an ambient environment temperature, and a posture. Due to these factors, page data is recorded at a different incidence angle of the reference light on the recording medium 1, for example, every ±0.3 deg and position of the recording medium.

Next, a recording position change of the recording medium 1 will be described. In the recording medium 1, allocation of an address value showing a physical position and a recording place of the recording medium 1 is performed. With respect to a recording address number, a physical recording place of the disk-shaped recording medium is associated with a rotation angle (θ) and a radius position (r) of the recording medium 1, the rotation angle (θ) and the radius position (r) are changed, and a recording position of the recording medium 1 for the objective lens 115 is changed. According to the recording address, the rotation angle (θ) and the radius position (r) of the recording medium 1 are associated and are converted into physical position information, the spindle motor 127 is rotated by a θ angle, the radius movement stage 128 is thread-moved, and positioning for a recording place of the recording medium corresponding to a target address is performed. If the recording address is input from an input terminal 138, the rotation angle (θ) and the radius movement position (r) of the recording medium 1 are associated with an address and converted by a medium position designating unit 135 and are transmitted to a medium movement control unit 134. The medium movement control unit 134 calculates a rotation movement amount and a thread movement amount from the current rotation angle (θ) and radius movement position (r) to the targeted rotation angle (θ) and radius movement position (r) and transmits calculation results to an r-θ driving unit 131.

The r-θ driving unit 131 rotates the spindle motor 127, thread-drives the radius movement stage 128, and performs positioning of the recording medium 1. In the above example, the recording position of the recording medium 1 is changed by moving the recording medium 1. However, the recording position of the recording medium 1 may be changed by moving an optical system such as the pickup 11.

Next, a reproduction sequence of the hologram will be described. Only the reference light 107 is incident on the recording medium 1, the light beam having transmitted the recording medium 1 is reflected by the galvanometer mirror 124 that can adjust an angle by the actuator 123, and reference light for reproduction is generated in a direction along the objective lens 115. The galvanometer mirror 124 performs angle control in conjunction with angle control of the galvanometer mirror 119. For example, the angle is controlled to an angle obtained by multiplying the angle of the galvanometer mirror 119 with a predetermined angle coefficient. The galvanometer mirror 124 functions as a phase conjugation mirror and in this embodiment, a galvanometer mirror is described. A conjugation lens and a fixed mirror may be separately provided. The reproduction light that is reproduced by the reference light for the reproduction propagates through the objective lens 115, the relay lens 113, and the polytopic filter 114. Then, the reproduction light transmits the PBS prism 111 and is incident on a light detector 150 and a recorded signal can be reproduced. The light detector 150 can use an imaging element. However, if page data can be reproduced, any element may be used.

Next, detailed reproduction of the hologram will be described.

A condition of the angle of the reference light to reproduce each page data in a plurality of page data (books) recorded on the same place of the recording medium 1 is that the reference light is incident at the same angle as an angle of the reference light incident on the recording medium 1 in the recording mode, in the reproduction mode. In addition, tolerance of an incidence angle of the reference light in the recording mode and the reproduction mode needs to be ±5 mdeg or less to obtain stable reproduction light. In addition, in one book, 400 page data are multiple-recorded and an angle interval of the reference light of each page data is 75 mdeg. If a first page in the book can be searched, second to four hundredth pages can be mechanically searched. In addition, the incidence angle offset of the reference light to which an environment temperature difference in the recording mode and the reproduction mode and an influence of hardening contraction of the recording medium after the recording are added needs to be added. However, because the offset angle can be calculated from computation, previous addition setting of the offset angle is easy.

However, the inclination posture (tilt) with the recording medium 1 for the objective lens 115 may not be constant whenever the recording medium 1 moves. Hereinafter, the tilt is described as a medium tilt for an optical reference point (for example, the objective lens 115) and an incidence angle (Bragg angle) of the reference light of the recording medium 1.

For example, when the rotation shaft of the spindle motor 127 and the recording medium 1 are obliquely mounted or there is mechanical tolerance, surface wobbling is generated by rotating the recording medium 1. In addition, a state of the recording medium 1 may be changed whenever the recording medium 1 is attached or detached. In addition, in the recording medium 1, surface distortion is generated in each recording place and the tilt is changed due to an individual difference, an ambient environment temperature, and a posture.

Due to these factors, an incidence angle of the reference light on the recording medium 1 for each position of the recording medium is changed in a range of ±0.3 deg. Because the incidence angle of the reference light is an independent event in the recording mode and the reproduction mode, an incidence angle of the reference light at which optimal reproduction light is obtained in the reproduction mode is unclear and a value thereof is different for each reproduction address of the recording medium. For example, it takes time to always set a reference light angle obtained by estimating a maximum value of all mechanical tolerances and search the first page of the page data from about the setting angle to search the first page in the book and a reproduction speed greatly decreases. An initial angle of the reference light at which the first page in the book can be searched at a high speed in the reproduction mode needs to be set. Detailed description is given using FIGS. 4 and 5.

Figure 4:
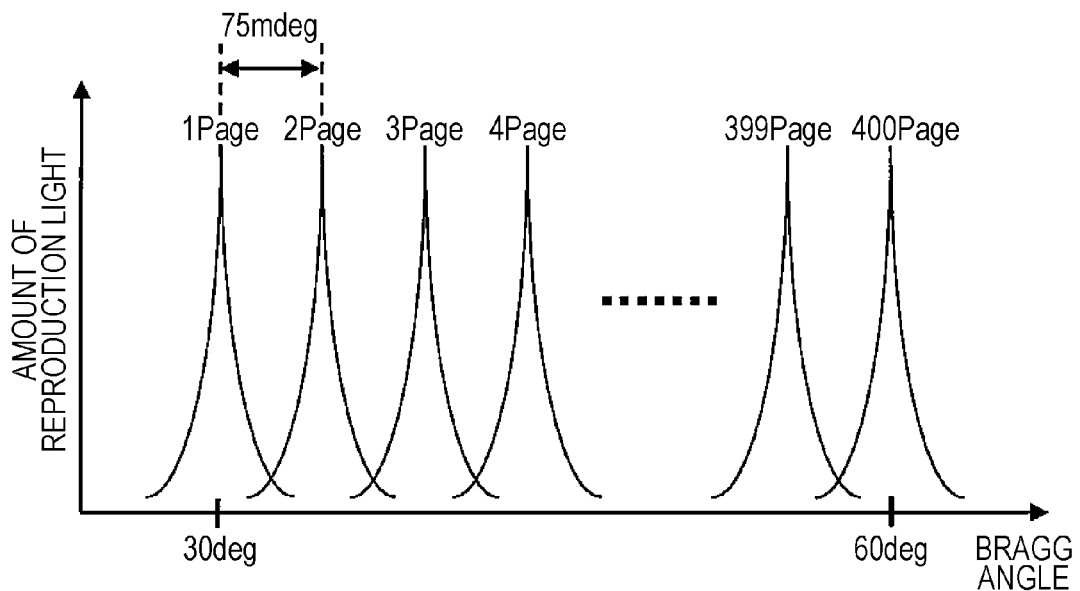
FIG. 4 is a diagram illustrating a reference light Bragg angle and an amount of reproduction light in a reproduction mode.
Figure 5:
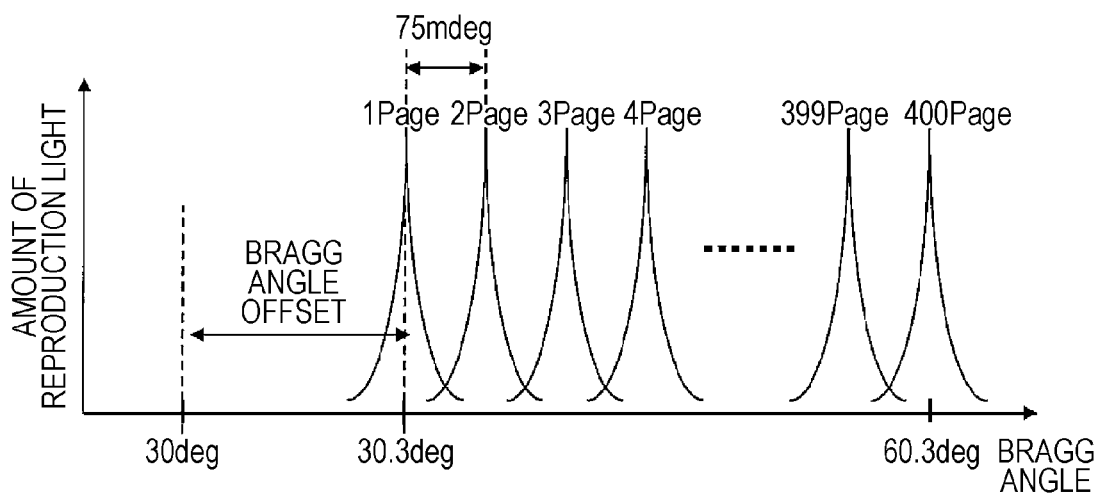
FIG. 5 is a diagram illustrating a reference light Bragg angle and an amount of reproduction light in a reproduction mode including a tilt.

FIGS. 4 and 5 illustrate an absolute value (a reference light Bragg angle) of a Bragg angle of the reference light of the page data in the reproduction. This shows an incidence angle of the reference light reflected from the galvanometer mirror 119 for a structure (not illustrated in the drawings) fixing the spindle motor 127 supporting the recording medium 1, not an incidence angle for the recording medium. An x axis shows a Bragg angle of reference light and a y axis shows an amount of reproduction light. The page data of the first to four hundredth pages is recorded when the Bragg angle of the reference light is 30 deg. For example, at a predetermined address of the recording medium 1, the page data of the first page exists at the Bragg angle of the reference light of 30 deg and 399 page data exist at an interval of 75 mdeg hereinafter, as illustrated in FIG. 4. However, at a predetermined address different from the above address, the page data of the first page exists when the Bragg angle of the reference light is 30.3 deg and the 399 page data exist at an interval of 75 mdeg hereinafter, as illustrated in FIG. 5. As such, an existence place of the Bragg angle (initial angle) of the reference light where the first page exists is unclear for each reproduction address, it takes time to search the initial angle whenever the reproduction address is updated, and the reproduction speed decreases. In order to realize the high-speed reproduction, it is important to prescribe an appropriate initial angle at any address in the reproduction mode.

Therefore, in the first embodiment, a configuration in which the incidence angle of the reference light for the recording medium 1 in the reproduction mode is reproduced by the same incidence angle of the reference light as that in the recording mode, an optimal initial angle of the reference light is determined for each address, and the first page can be searched at a high speed is realized. Hereinafter, the configuration will be described.

Figure 6:
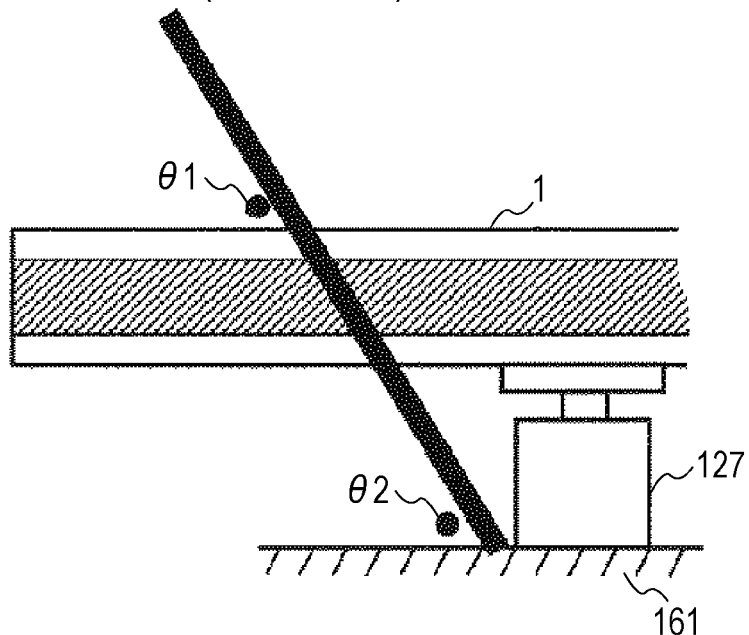
FIG. 6 is a diagram illustrating reference light incident on a recording medium in a recording mode.

FIG. 6 illustrates a relation of incidence angles of the reference light on the recording medium 1 and a structure 161 supporting the spindle motor 127 in the recording mode. For example, when the page data (first page) is recorded in a state in which the structure 161 and the recording medium 1 are in a relation of an mechanical ideal state (parallel state), an incidence angle ($\theta$1) on the recording medium 1 and an incidence angle ($\theta$2) on the structure 161 are equal to each other. Next, the case in which the recording medium is temporarily removed and the recording medium is mounted to the spindle motor 127 again is illustrated in FIG. 7.

Figure 7:
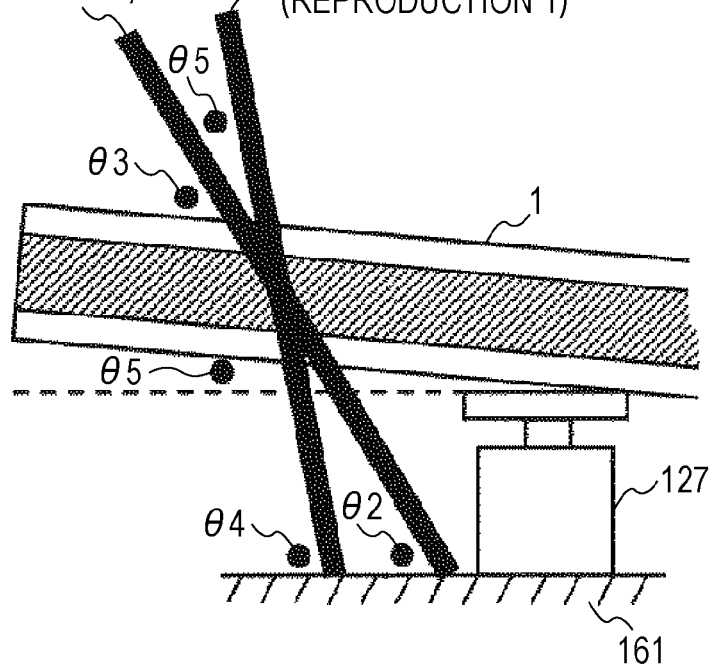
FIG. 7 is a diagram illustrating reference light incident on a recording medium in a reproduction mode.

In reproduction of FIG. 7, in the reference light (reproduction 1) of FIG. 7 having the same reference light angle as that in the recording mode at the same address as that of FIG. 6, the incidence angle of the reference light on the structure 161 is $\theta$2 and is the same as that in the recording mode. However, the incidence angle of the reference light on the recording medium 1 is $\theta$3 and the reference light is deviated by a recording medium tilt difference ($\theta$5) with the recording mode and is incident. By setting the angle to $\theta$2 obtained by adding the deviation angle ($\theta$5) to the reference light angle ($\theta$3) in the reproduction mode ($\theta$3+$\theta$5), the reference light incidence angle for the recording medium 1 in the reproduction mode can be equalized to the reference light incidence angle in the recording mode, the reference light initial angle to reproduce the first page data in the book is prescribed, and a search time can be shortened.

In addition, due to an influence of medium contraction by hardening of the recording medium 1 before the recording and after the recording or expansion/contraction of the recording medium 1 by a temperature difference of the recording medium 1 in the recording mode and the reproduction mode, a reference light angle at which reproduction diffracted light is maximally obtained can be calculated by computing an offset angle of a predetermined angle for the reference light angle in the recording mode. The calculated reference light offset angle is added to $\theta$2, the initial angle of the reference light to reproduce the data of the first page in the book is prescribed, and the search time can be further shortened.

Figure 10:
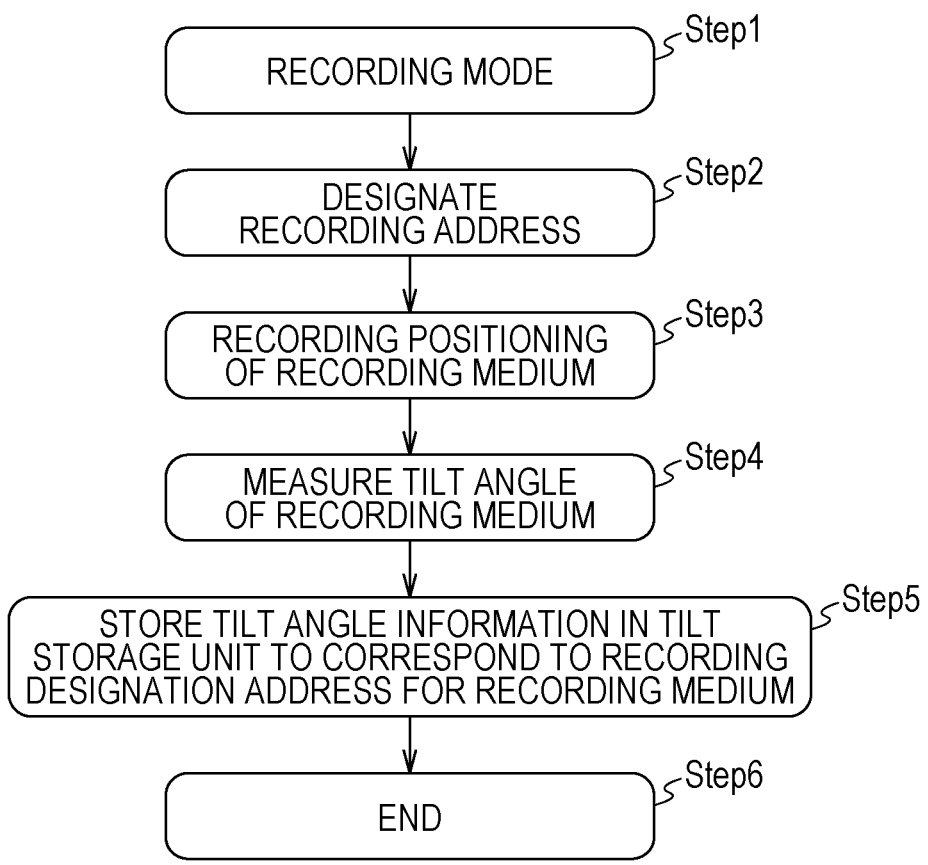
FIG. 10 is an operation flow in a recording mode.

Hereinafter, an operation thereof will be described using the block diagram of FIG. 1 and an operation flow of FIG. 10.

First, tilt measurement and a storage operation thereof in the recording mode (Step 1) will be described using FIG. 1. A recording address is designated (Step 2). If a recording positioning operation of the recording medium 1 is completed (Step 3), a tilt measuring device 126 provided on the predetermined optical reference point of the pickup 11 is used to measure a tilt of the recording medium 1 for the optical reference point (Step 4). The tilt measuring device 126 performs optical tilt measurement using surface reflection of the recording medium 1. However, if the tilt for the surface of the recording medium 1 can be measured from the optical reference point, the present invention is not limited thereto and any measuring mechanism may be used. Here, the tilt measurement means both tilt angle measurement of a Bragg direction and tilt angle measurement of a radial direction. However, an operation for the tilt angle of the Bragg direction associated with the reference light angle will be described hereinafter. In the following description, the tilt shows a tilt of the Bragg angle direction. A position on the recording medium 1 to measure the tilt is a recording position of the hologram or a position of the recording medium 1 closest to the objective lens 115 or the scanner lens 122, which is a neighboring position of the recording position. A tilt detection signal that is measured by the tilt measuring device 126 is transmitted to a tilt operation unit 130 and tilt angle information is operated. The tilt angle information is transmitted from the tilt operation unit 130 to a tilt storage unit 133 and the tilt angle information is stored in the tilt storage unit 133 to correspond to an address of the recording medium (Step 5).

Meanwhile, for a recording address showing the recording position of the recording medium, the recording address is input from the input terminal 138 and is transmitted to the medium position designating unit 135. A recording address value is input from the medium position designating unit 135 to the tilt storage unit 133 and the recording address and the tilt angle information are recorded in the tilt storage unit 133 (Step 5). Thereby, the tilt angle information for each address can be stored for the entire surface of the recording medium, in the recording mode. The tilt measurement operation and the tilt measurement result are stored to correspond to all of the hologram storage places (books) on the recording medium. However, a plurality of books may be stored in one area. This case corresponds to the case in which a size of the hologram 125 for the recording medium 1 is small as a square size of 760 μm×380 μm and a change amount of the tilt for the recording places corresponding to the plurality of books is small and efficiency is good. Hereinafter, the operation of the embodiment is described for an address of each book. However, the address may be defined as a predetermined area and the operation may be executed for an assembly area of holograms of a predetermined number. For example, the operation may be executed in a Cure site unit (for example, an area of holograms of 80×80) to carry out Cure or a book case unit (for example, an area of cure sites of an integral number), particularly, in a unit in which the number of holograms is arranged on a sequence of a recording process. In addition, the number of holograms in the area is not limited and may be variously changed according to a physical state of the recording medium. In addition, it is not necessary to target the entire recording medium.

Figure 3:
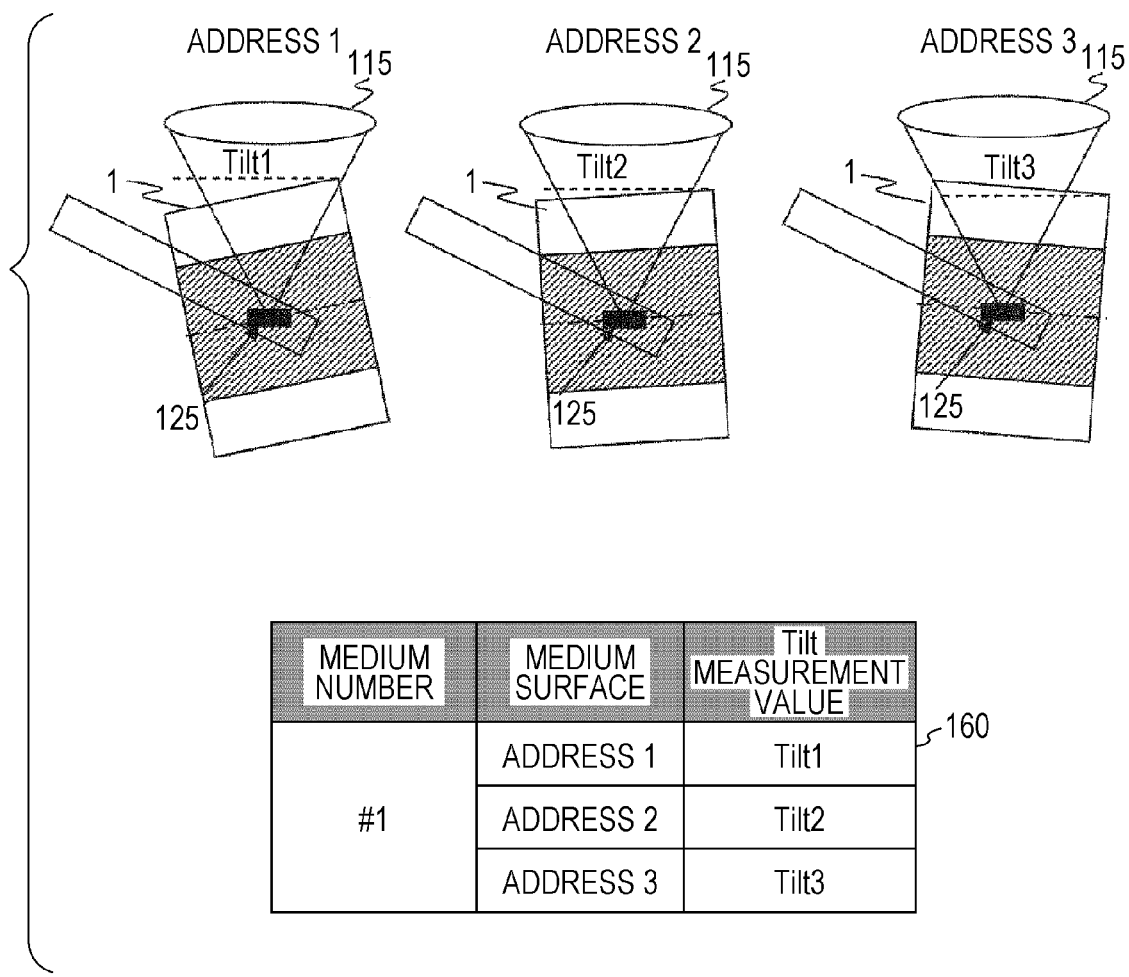
FIG. 3 is a diagram illustrating storage of a medium recording position and a tilt measurement result.

FIG. 3 is a conceptual diagram of storage of a tilt measurement result for a recording place (address). At an address 1 of FIG. 3, the tilt measurement result of the objective lens 115 and the recording medium 1 is (Tilt1). Next, an address 2 to record the hologram 125 shows a state in which the recording medium 1 shows a different inclination as compared with the address 1 and the tilt measurement result of the recording medium 1 for the objective lens 115 is (Tilt2). Next, an address 3 to record the hologram 125 shows a state in which the recording medium 1 is further inclined and the tilt measurement result of the recording medium 1 for the objective lens 115 is (Tilt3). For the tilt result measured for each address, the tilt measurement result is associated with each address and the tilt measurement result and each address are stored in the tilt storage unit 133. An example of internal information of the tilt storage unit 133 is illustrated in 160 of FIG. 3. The tilt storage unit 133 is included in an optical information recording/reproducing device not illustrated in the drawings. At this time, the recording medium and a unique number are associated and are stored. A medium number is input from the input terminal 137 to the tilt storage unit 133.

The unique number may be a number of the optical information recording/reproducing device not illustrated in the drawings and a medium number thereof, for example, a number of a recording page number or a series number of the medium. The reason why the unique number is added and information is stored is that tilt measurement results of a plurality of recording media are stored in one optical information recording/reproducing device and a tilt result corresponding to each recording medium can be referred to.

Figure 11:
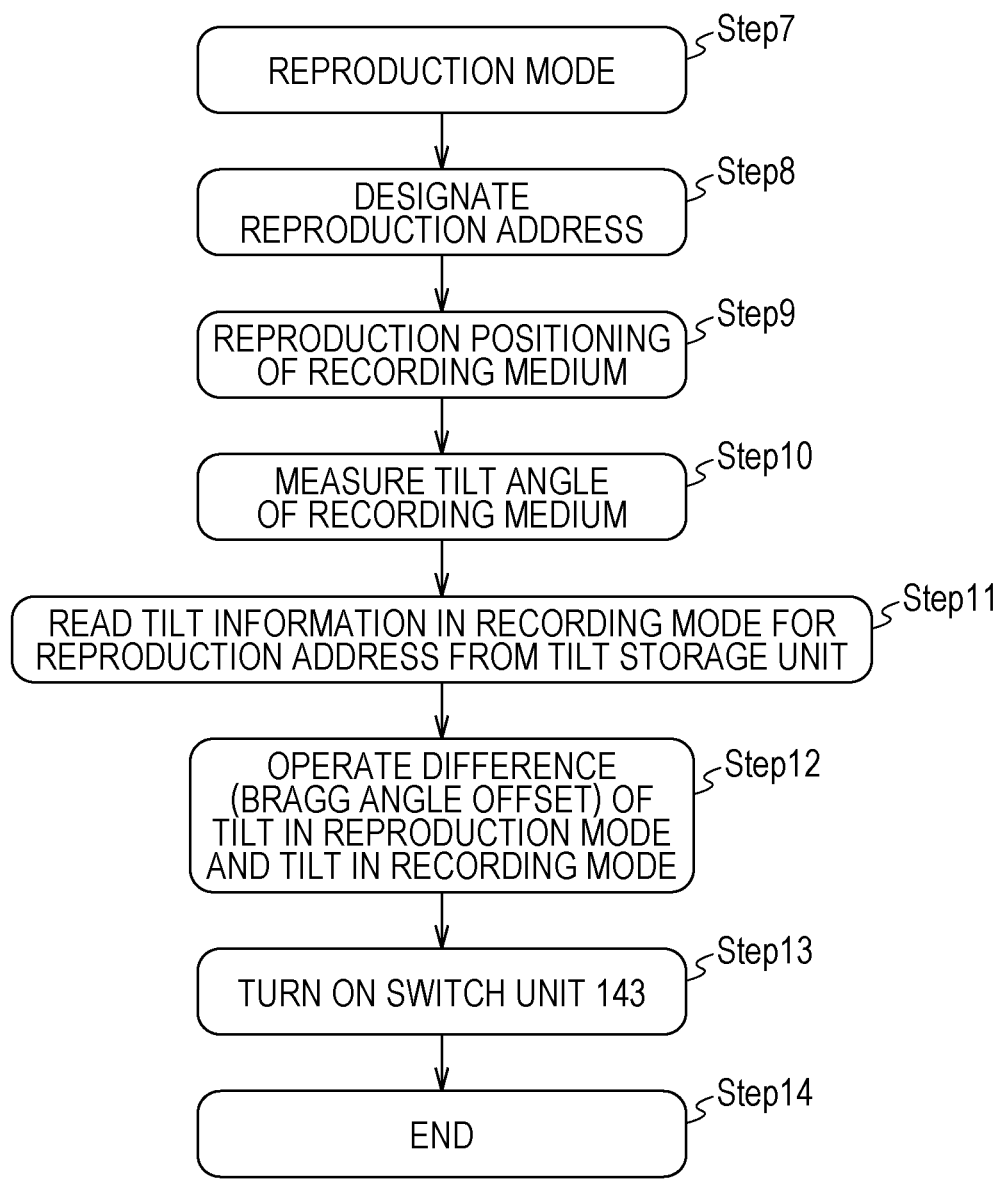
FIG. 11 is an operation flow in a reproduction mode.

Next, an operation of the Bragg angle control of the galvanometer mirror 119 in the reproduction mode will be described using FIGS. 1 and 11. In the reproduction mode (Step 7), if a reproduction address is designated from the input terminal 138 (Step 8), the rotation angle (θ) and the radius movement position (r) of the recording medium 1 are associated with the address and converted by the medium position designating unit 135 and are transmitted to the medium movement control unit 134. The medium movement control unit 134 calculates a rotation movement amount and a thread movement amount from the current rotation angle (θ) and radius movement position (r) to the targeted rotation angle (θ) and radius movement position (r) and transmits calculation results to the r-θ driving unit 131. The r-θ driving unit 131 rotates the spindle motor 127, thread-moves the radius movement stage 128, and performs reproduction positioning of the recording medium 1 (Step 9). If the reproduction positioning is completed, the tilt of the recording medium for the optical reference point is measured by the tilt measuring device 126 provided on the optical reference point of the pickup 11 (Step 10). The measurement signal from the tilt measuring device 126 is transmitted to the tilt operation unit 130 and a value of the tilt angle is operated. The value of the tilt angle is transmitted to the total tilt operation unit 132. Meanwhile, a reproduction designated address is transmitted to the tilt storage unit 133 through the medium position designating unit 135. The tilt information in the recording mode associated with the designated address is read from the tilt storage unit 133 (Step 11) and is transmitted to the total tilt operation unit 132. The total tilt operation unit 132 operates a difference of tilt information in the reproduction mode and tilt information in the recording mode (Step 12). The difference corresponds to a Bragg angle offset in the recording mode and the reproduction mode. Bragg angle offset information is transmitted from the total tilt operation unit 132 to the angle command unit 141 through the switch unit 143. A reproduction mode on signal is input from the input terminal 136 to the switch unit 143 and the switch unit 143 is turned on (Step 13). This is to input the Bragg angle offset in the reproduction mode to the angle command unit 141.

FIG. 5 illustrates a relation of a Bragg angle and a reproduction light amount for each page in the case of the Bragg angle offset. When the Bragg angle offset at the designated reproduction address is +0.3 deg, the angle command unit 141 operates the angle as a command angle obtained by adding +0.3 deg of the Bragg angle offset to a galvanometer mirror command angle in the recording mode and transmits a galvanometer mirror control angle command value to the galvanometer mirror control unit 140. In this way, the initial angle in the reproduction mode can be positioned at 30.3 deg, the first page data can be searched easily at a high speed, and because angles for the second to four hundredth pages are prescribed at an equal interval of 75 mdeg, the galvanometer mirror can be positioned at a surrounding portion of each page data at a high speed. The tilt storage unit 133 may be provided in an optical information recording/reproducing device not illustrated in the drawings or a host management system connected to the optical information recording/reproducing device not illustrated in the drawings. Because the tilt storage unit 133 stores tilt information for each address of a plurality of recording media handled by the optical information recording/reproducing device not illustrated in the drawings, it is necessary to allocate a unique number to each recording medium and identify the recording medium by the unique number of the recording medium in the reproduction mode. For example, a semiconductor memory and a magnetic memory may be included in a case covering a recording medium not illustrated in the drawings, the unique number of the recording medium may be recorded in the memory, and the unique number of the recording medium may be identified by reading the unique number from the memory. In addition, in the memory, an RFID may be buried in a part of an inner portion of the recording medium, the recording medium unique number may be recorded, and a read operation may be executed.

In the first embodiment described above, in the recording mode, the tilt measurement result of the recording medium for the recording address is stored and in the reproduction mode, a tilt difference value of the tilt measurement result of the recording medium for the reproduction address and the stored tilt measurement result of the recording medium in the recording mode is added to the reference light Bragg angle in the reproduction mode. As a result, the reference light incidence angle for the recording medium can be equalized in the recording mode and the reproduction mode and the page data in the book in the reproduction mode can be searched at a high speed.

In addition, the example of the case in which the tilt measurement result when the recording is performed for every predetermined area is stored has been described. However, when the difference of the tilts for every predetermined area is small, the unique number of the recording medium and information regarding the tilt in the recording mode may be associated and stored without storing the tilt measurement result when the recording is performed for every predetermined area.

Second Embodiment

Figure 2:
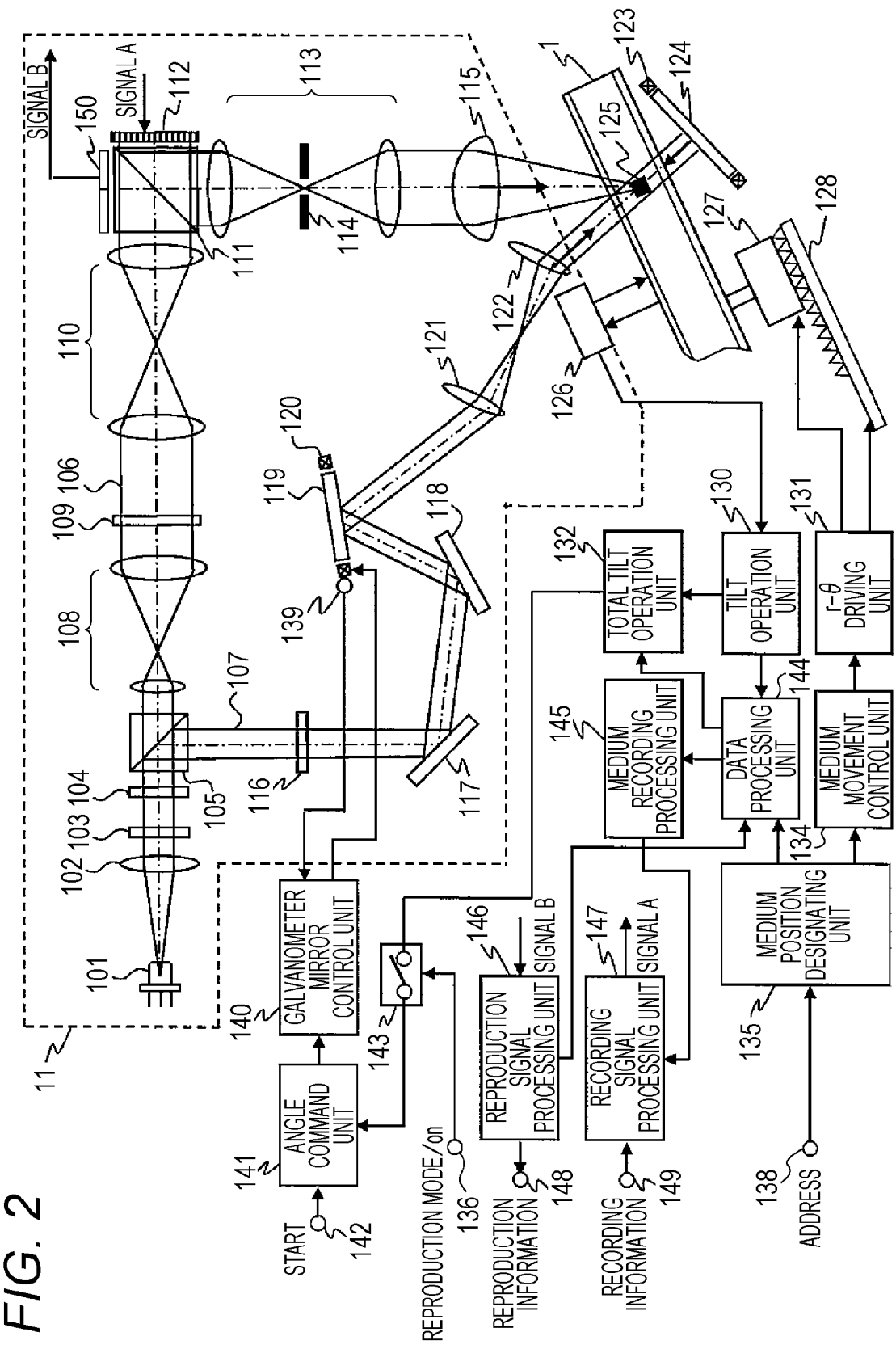
FIG. 2 is a diagram illustrating a second embodiment of the present invention.

A second embodiment of the present invention will be described using FIG. 2. The description of the same functional blocks as those of FIG. 1 is omitted. In this embodiment, a measurement result of a recoding medium tilt in a recording mode corresponding to an address of a recording medium 1 is recorded on a management information unit of the recording medium 1 and reproduction is performed. Hereinafter, an operation thereof will be described using FIG. 2.

First, an operation in a recording mode will be described. If a recording address is input from an input terminal 138, a rotation angle (θ) and a radius movement position (r) of the recording medium 1 are associated with a recording address and converted by a medium position designating unit 135 and are transmitted to a medium movement control unit 134. The medium movement control unit 134 calculates a rotation movement amount and a thread movement amount from the current rotation angle (θ) and radius movement position (r) to the targeted rotation angle (θ) and radius movement position (r) and transmits calculation results to an r-θ driving unit 131. The r-θ driving unit 131 rotates a spindle motor 127, thread-moves a radius movement stage 128, and performs recording positioning of the recording medium 1. Next, if the recording positioning is completed, a tilt measuring device 126 provided on an optical reference point of a pickup 11 is used to measure a tilt of the recording medium 1 for the optical reference point. A measurement signal from the tilt measuring device 126 is transmitted to a tilt operation unit 130 and a value of a tilt angle is operated. Information of the tilt angle is transmitted to a data processing unit 144. Recording address information designated from the input terminal 138 is transmitted to the data processing unit 144 through a medium position designating unit 135. The data processing unit 144 collects tilt measurement results in association with the designated recording address, executes a table data process, and transmits the tilt measurement results to a recording signal processing unit 145. The recording signal processing unit 145 converts the recording address and the tilt information converted into the table data into a signal for recording and inputs the signal to the recording signal processing unit 147. The recording signal processing unit 145 inputs recording information (management information and user data) from the input terminal 149 and the recording address and the tilt information converted into the signal for the recording to the recording signal processing unit 147 and the recording signal processing unit 147 generates recording data (a signal A) to be recorded on the recording medium, inputs the recording data to a spatial light modulator 112, optically generates hologram recording data, and records the hologram recording data on the recording medium 1.

The management information includes information of the recording data and the recording address, information regarding the life of the medium, information showing a defect position of the medium, information including recording conditions and environment conditions, and information of a tilt measurement result for an address in a recording mode and is important information. The management information is recorded at a stable position of a portion in which a distortion amount of the recording medium is smallest.

Next, a reproduction operation of the information of the tilt measurement result for the address included in the management information in the recording medium will be described. If a reproduction address of the management information is input from the input terminal 138, the recording medium 1 performs a positioning operation for the address, reproduction light is incident on a light detector 150, and a signal B is input as a reproduction signal to the reproduction signal processing unit 146. The reproduction signal processing unit 146 outputs reproduction information to an output terminal 148 and all addresses of the recording medium 1 and tilt measurement value information in the recording mode corresponding to the addresses are input to the data processing unit 144. Because Bragg angle control of a galvanometer mirror 119 in the reproduction mode is the same as that in the first embodiment, the operation description is omitted.

In the second embodiment described above, the tilt information in the recording mode is added to the management information of the recording medium and recording is performed and the tilt information is obtained as the reproduction signal from the recording medium in the reproduction mode. As a result, it is not necessary to store the tilt information in an internal memory of an optical information recording/reproducing device not illustrated in the drawings or a host management system connected to the optical information recording/reproducing device not illustrated in the drawings and the tilt information can be surely managed for each recording medium.

The present invention is not limited to the embodiments described above and various modifications are included in the present invention. For example, the embodiments are described in detail to facilitate the description of the present invention and are not limited to embodiments in which all of the described configurations are included. In addition, a part of the configurations of the certain embodiment can be replaced by the configurations of another embodiment or the configurations of another embodiment can be added to the configurations of the certain embodiment. In addition, for a part of the configurations of the individual embodiments, other configurations can be added, deleted, and replaced.

In addition, a part or all of the individual configurations, functions, processing units, and processing mechanisms may be designed by integrated circuits and may be realized by hardware. In addition, the individual configurations and functions may be realized by software by analyzing programs for realizing the functions by a processor and executing the programs by the processor. Information such as the programs, the tables, and the files for realizing the individual functions and the data may be stored in a recording device such as a memory, a hard disk, and a solid state drive (SSD) or a recording medium such as an IC card, an SD card, and a DVD.

In addition, only control lines or information lines necessary for explanation are illustrated and the control lines or information lines do not mean all control lines or information lines necessary for a product. In actuality, almost all configurations may be connected to each other.

What is claimed is:

1. An optical information recording/reproducing device that radiates signal light and reference light to a recording medium, forms a hologram, and records information and emits the reference light to the hologram of the recording medium and reproduces information, the optical information recording/reproducing device comprising:
  a laser light source that generates the signal light and the reference light;
  a light angle control unit that controls an angle of the reference light incident on the recording medium;
  a light detecting unit that detects diffracted light when the reference light is radiated to the recording medium;
  a positioning unit that allocates an address to the recording medium and performs positioning of the recording medium for the address;
  a tilt measuring unit that measures a tilt of the recording medium; and
  a control unit that controls the incidence angle of the reference light by the light angle control unit, on the basis of a tilt measurement result in a recording mode, which is stored in a storage unit and is measured by the tilt measuring unit, in a reproduction mode, wherein
  the storage unit stores the address and the tilt measurement result for the address in the recording mode and the control unit controls the incidence angle of the reference light by the light angle control unit, on the basis of the address and the tilt measurement result for the address in the recording mode, in the reproduction mode.

2. The optical information recording/reproducing device according to claim 1, further comprising a scanner lens that radiates the reference light to the recording medium, wherein
  the tilt measuring unit measures a tilt of the recording medium for a predetermined point of an optical structure including the scanner lens.

3. The optical information recording/reproducing device according to claim 1, further comprising:
  a spatial light modulating unit that adds information to the signal light; and
  an objective lens that radiates the signal light to which the information has been added to the recording medium, wherein
  the tilt measuring unit measures a tilt of the recording medium for a predetermined point of an optical structure including the objective lens.

4. The optical information recording/reproducing device according to claim 1, wherein
  the tilt measuring unit measures a tilt of a Bragg angle direction of the reference light angle.

5. The optical information recording/reproducing device according to claim 1, wherein
  the address is defined as an area in which a plurality of addresses are collected.

6. The optical information recording/reproducing device according to claim 1, wherein
  the storage unit is included in the optical information recording/reproducing device.

7. The optical information recording/reproducing device according to claim 1, further comprising:
  a management information generating unit that generates management information of the recording medium;
  a tilt information adding unit that adds the tilt measurement result and the measured address information to the management information;
  a management information recording unit that records the management information on the recording medium; and
  a management information reproducing unit that reproduces the management information from the recording medium.

8. The optical information recording/reproducing device according to claim 1, wherein
  the tilt measurement result and address information are stored in the storage unit together with a unique number of the recording medium, the tilt measurement result and the address information corresponding to the unique number are read, and reproduction is performed.

9. The optical information recording/reproducing device according to claim 8, further comprising:
  a management information generating unit that generates management information of the recording medium;
  a tilt information adding unit that adds the tilt measurement result and the measured address information to the management information;
  a management information recording unit that records the management information on the recording medium; and
  a management information reproducing unit that reproduces the management information from the recording medium.

10. An optical information recording/reproducing device that radiates signal light and reference light to a recording medium, forms a hologram, and records information and emits the reference light to the hologram of the recording medium and reproduces information, the optical information recording/reproducing device comprising:
  a laser light source that generates the signal light and the reference light;
  a light angle control unit that controls an angle of the reference light incident on the recording medium;
  a light detecting unit that detects diffracted light when the reference light is radiated to the recording medium;
  a positioning unit that allocates an address to the recording medium and performs positioning of the recording medium for the address;
  a tilt measuring unit that measures a tilt of the recording medium; and
  a control unit that controls the incidence angle of the reference light by the light angle control unit, on the basis of a tilt measurement result in a recording mode, which is stored in a storage unit and is measured by the tilt measuring unit, in a reproduction mode, wherein
  the tilt measurement result and address information are stored in the storage unit together with a unique number of the recording medium, the tilt measurement result and the address information corresponding to the unique number are read, and reproduction is performed.

11. The optical information recording/reproducing device according to claim 10, further comprising:
  a management information generating unit that generates management information of the recording medium;
  a tilt information adding unit that adds the tilt measurement result and the measured address information to the management information;
  a management information recording unit that records the management information on the recording medium; and
  a management information reproducing unit that reproduces the management information from the recording medium.

12. An optical information recording/reproducing device that radiates signal light and reference light to a recording medium, forms a hologram, and records information and emits the reference light to the hologram of the recording medium and reproduces information, the optical information recording/reproducing device comprising:
  a laser light source that generates the signal light and the reference light;

a light angle control unit that controls an angle of the reference light incident on the recording medium;

a light detecting unit that detects diffracted light when the reference light is radiated to the recording medium;

a positioning unit that allocates an address to the recording medium and performs positioning of the recording medium for the address;

a tilt measuring unit that measures a tilt of the recording medium;

a control unit that controls the incidence angle of the reference light by the light angle control unit, on the basis of a tilt measurement result in a recording mode, which is stored in a storage unit and is measured by the tilt measuring unit, in a reproduction mode, a management information generating unit that generates management information of the recording medium;

a tilt information adding unit that adds the tilt measurement result and the measured address information to the management information;

a management information recording unit that records the management information on the recording medium; and a management information reproducing unit that reproduces the management information from the recording medium.

13. An optical information recording/reproducing method that radiates signal light and reference light to a recording medium, forms a hologram, and records information and emits the reference light to the hologram of the recording medium and reproduces information, the optical information recording/reproducing method comprising:

generating the signal light and the reference light;

controlling an angle of the reference light incident on the recording medium;

allocating an address to the recording medium and performing positioning of the recording medium for the address;

measuring a tilt of the recording medium in a recording mode;

storing the address and a tilt measurement result for the address measured by the tilt measurement; and controlling the incidence angle of the reference light, on the basis of the address and the tilt measurement result for the address, in a reproduction mode.

14. The optical information recording/reproducing method according to claim 13, wherein in the measuring of the tilt, a tilt of a Bragg angle direction of the reference light angle is measured.

15. The optical information recording/reproducing method according to claim 13, wherein the address is defined as an area in which a plurality of addresses are collected.

16. The optical information recording/reproducing method according to claim 13, wherein the tilt measurement result and address information are stored together with a unique number of the recording medium, the tilt measurement result and the address information corresponding to the unique number are read, and reproduction is performed.

17. The optical information recording/reproducing method according to claim 13, further comprising generating management information of the recording medium;

adding the tilt measurement result and the measured address information to the management information;

recording the management information on the recording medium; and reproducing the management information from the recording medium.

18. The optical information recording/reproducing method according to claim 16, further comprising generating management information of the recording medium;

adding the tilt measurement result and the measured address information to the management information;

recording the management information on the recording medium; and reproducing the management information from the recording medium.

* * * * *